(12) United States Patent
Nawata et al.

(10) Patent No.: US 10,408,167 B2
(45) Date of Patent: Sep. 10, 2019

(54) HYBRID VEHICLE

(71) Applicant: TOYOTA JIDOSHA KABUSHIKI KAISHA, Toyota-shi, Aichi-ken (JP)

(72) Inventors: Hidekazu Nawata, Gotemba (JP); Toshio Inoue, Gotemba (JP); Keita Fukui, Fujinomiya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 56 days.

(21) Appl. No.: 15/080,898

(22) Filed: Mar. 25, 2016

(65) Prior Publication Data

US 2016/0280202 A1 Sep. 29, 2016

(30) Foreign Application Priority Data

Mar. 27, 2015 (JP) .................... 2015-066893

(51) Int. Cl.
*F02M 25/08* (2006.01)
*B60W 10/06* (2006.01)
(Continued)

(52) U.S. Cl.
CPC ......... *F02M 25/0836* (2013.01); *B60K 6/445* (2013.01); *B60L 50/62* (2019.02); *B60L 55/00* (2019.02); *B60W 10/06* (2013.01); *B60W 10/08* (2013.01); *B60W 10/26* (2013.01); *B60W 20/16* (2016.01); *B60W 30/18054* (2013.01); *F02D 41/0032* (2013.01); *B60K 2015/03561* (2013.01); *B60L 2240/36* (2013.01); *B60L 2240/547* (2013.01); *B60L 2240/549* (2013.01);
(Continued)

(58) Field of Classification Search
CPC . H02J 7/22; H02J 7/244; F02B 63/04; B60W 20/16; B60W 10/06; B60W 10/08; B60W 10/26; B60W 30/18054; B60L 50/62; B60L 55/00; B60K 6/445; F02D 41/0032; F02M 25/0836
USPC .......................................... 290/50
See application file for complete search history.

(56) References Cited

U.S. PATENT DOCUMENTS 5,158,054 A * 10/1992 Otsuka ............... F02M 25/0809
123/198 D
5,751,137 A 5/1998 Kiuchi et al.
(Continued)

FOREIGN PATENT DOCUMENTS

JP 10-2240 1/1998
JP 2009-85036 4/2009
JP WO 2014196122 A1 * 12/2014 ........... F01N 3/2006

*Primary Examiner* — Charles Reid, Jr.
(74) *Attorney, Agent, or Firm* — Finnegan, Henderson, Farabow, Garrett & Dunner, LLP

(57) ABSTRACT

In a case where external electricity feed is being performed, a water temperature threshold Tref is set to a temperature T2 that is lower than in a case where the external electricity feed is not being performed, and canister puree is executed when an engine is in operation and a cooling water temperature Tw is the water temperature threshold Tref or higher. Thereby, it is possible to increase the opportunity to perform the canister purge, and to enhance evaporative emission performance. Furthermore, in the case where the external electricity feed is being performed, a maximum purge rate Pmax is set to a value P2 that is greater than in the case where the external electricity feed is not being performed. Thereby, it is possible to quickly complete the canister purge.

3 Claims, 5 Drawing Sheets

(51) Int. Cl.
- *B60W 10/08* (2006.01)
- *B60W 10/26* (2006.01)
- *B60W 30/18* (2012.01)
- *B60W 20/16* (2016.01)
- *F02D 41/00* (2006.01)
- *B60L 50/62* (2019.01)
- *B60L 55/00* (2019.01)
- *B60K 6/445* (2007.10)
- *B60K 15/035* (2006.01)

(52) U.S. Cl.
CPC . *B60W 2510/087* (2013.01); *B60W 2510/244* (2013.01); *F02D 2200/021* (2013.01); *Y02E 60/721* (2013.01); *Y02T 10/6217* (2013.01); *Y02T 10/6239* (2013.01); *Y02T 10/6269* (2013.01); *Y02T 10/6286* (2013.01); *Y02T 10/7005* (2013.01); *Y02T 10/7072* (2013.01); *Y02T 10/7077* (2013.01); *Y02T 90/121* (2013.01); *Y02T 90/128* (2013.01); *Y02T 90/14* (2013.01); *Y02T 90/163* (2013.01); *Y04S 10/126* (2013.01); *Y10S 903/903* (2013.01)

(56) References Cited

U.S. PATENT DOCUMENTS

| | | | | |
|---|---|---|---|---|
| 6,268,986 B1* | 7/2001 | Kobayashi | | H03K 17/0828 361/24 |
| 6,622,804 B2* | 9/2003 | Schmitz | | B60W 20/13 180/65.245 |
| 7,430,469 B2* | 9/2008 | Kaita | | B60K 6/445 123/516 |
| 2006/0113798 A1* | 6/2006 | Oyobe | | B60K 6/26 290/7 |
| 2007/0251509 A1* | 11/2007 | Nakano | | F02D 41/0045 123/519 |
| 2007/0255485 A1* | 11/2007 | Kaita | | B60K 6/445 701/102 |
| 2008/0147294 A1* | 6/2008 | Tomatsuri | | F02D 41/0055 701/102 |
| 2010/0000501 A1* | 1/2010 | Douzono | | F02D 19/0631 123/578 |
| 2010/0019570 A1* | 1/2010 | Kade | | B60R 16/03 307/10.1 |
| 2010/0019728 A1* | 1/2010 | Ichikawa | | B60L 1/003 320/134 |
| 2010/0038160 A1* | 2/2010 | Osawa | | B60K 6/365 180/65.275 |
| 2010/0094493 A1* | 4/2010 | Atsumi | | F02D 29/06 701/22 |
| 2011/0031937 A1* | 2/2011 | Bito | | B60K 6/46 320/150 |
| 2012/0098488 A1* | 4/2012 | Ichikawa | | B60L 11/1816 320/109 |
| 2012/0312281 A1* | 12/2012 | Tsutsumi | | F02M 25/089 123/519 |
| 2013/0008415 A1* | 1/2013 | Matsunaga | | F02M 25/0809 123/520 |
| 2013/0103243 A1* | 4/2013 | Teraya | | F02D 41/0002 701/22 |
| 2013/0151052 A1* | 6/2013 | Fukuzawa | | B60W 20/00 701/22 |
| 2015/0345411 A1* | 12/2015 | Ooiwa | | F02D 41/004 123/520 |

* cited by examiner

HYBRID VEHICLE

INCORPORATION BY REFERENCE

The disclosure of Japanese Patent Application No. 2015-066893 filed on Mar. 27, 2015 including the specification, drawings and abstract is incorporated herein by reference in its entirety.

BACKGROUND OF THE INVENTION

1. Field of the Invention

The invention relates to a hybrid vehicle, and in detail, relates to a hybrid vehicle that can perform an external electricity feed to an external device.

2. Description of Related Art

Conventionally, as this kind of hybrid vehicle, there has been proposed a plug-in hybrid vehicle that can be charged from an external electric power source, that estimates the evaporated fuel adsorption state of a canister, and that switches from an electric running to a hybrid running in which an engine is driven, based on the estimated adsorption state and the running load (for example, Japanese Patent Application Publication No. 2009-085036). The plug-in hybrid vehicle performs the hybrid running based on the evaporated fuel adsorption state of the canister. Thereby, even a plug-in hybrid vehicle having a little time and frequency with respect to the drive of the engine can surely purge the evaporated fuel adsorbed in the canister, to the engine. Here, the vehicle estimates the evaporated fuel adsorption state of the canister, based on outside air temperature.

As the hybrid vehicle, there is a hybrid vehicle that not only receives the charge from the external electric power source but also feeds electricity to an external device outside the vehicle. In this case, when state-of-charge SOC of a battery becomes low due to the external electricity feed, the hybrid vehicle starts the engine, and charges the battery by the electricity generation with an electric generator, using the dynamic power from the engine. Such an engine drive during the external electricity feed is performed for some degree of battery charge. Therefore, the operating time of the engine is often short, and an execution condition for purging the evaporated fuel adsorbed in the canister to the engine is not often satisfied. Meanwhile, during the external electricity feed, the vehicle is at a stop, and therefore, the influence of the canister purge on drivability is smaller than during running.

SUMMARY OF THE INVENTION

The invention provides a hybrid vehicle that increases the opportunity to purge the evaporated fuel adsorbed in the canister.

A hybrid vehicle according to an aspect of the invention is a hybrid vehicle including: an engine to receive feed of fuel stored in a fuel tank and to output dynamic power; a canister to adsorb evaporated fuel generated in the fuel tank; a purge valve attached to a feed pipe, the feed pipe being a pipe through which evaporated fuel gas is fed to an intake pipe of the engine, the evaporated fuel gas containing the evaporated fuel adsorbed by the canister; an electronic control unit configured to perform an opening-closing control of the purge valve such that the evaporated fuel gas is fed to the intake pipe; an electric generator to generate electricity using the dynamic power from the engine; a battery connected with the electric generator through an electric power line; and an external electricity feed apparatus to perform an external electricity feed by which electric power on the electric power line is fed to an external device, in which the electronic control unit is configured to perform the opening-closing control of the purge valve using an execution condition, in a case where the external electricity feed apparatus is performing the external electricity feed, the execution condition being a condition under which the evaporated fuel gas is fed to the intake pipe more easily than in a case where the external electricity feed apparatus is not performing the external electricity feed.

In the case where the external electricity feed apparatus is performing the external electricity feed, the hybrid vehicle according to the above aspect of the invention performs the opening-closing control of the purge valve attached to the feed pipe through which the evaporated fuel gas is fed to the intake pipe of the engine, using the execution condition under which the evaporated fuel gas is fed from the canister to the intake pipe of the engine more easily than in the case where the external electricity feed apparatus is not performing the external electricity feed. Thereby, in the case where the external electricity feed apparatus is performing the external electricity feed, the feed (so-called canister purge) of the evaporated fuel gas from the canister to the intake pipe is executed easily. As a result, it is possible to increase the opportunity to perform the canister purge, and to enhance evaporative emission performance. Further, it is possible to suppress the increase in the operating time of the engine due to the canister purge after the external electricity feed.

In the hybrid vehicle according to the above aspect of the invention, in the case where the external electricity feed apparatus is not performing the external electricity feed, the execution condition may be a condition that temperature of cooling water for the engine is a first temperature or higher, and in the case where the external electricity feed apparatus is performing the external electricity feed, the execution condition may be a condition that the temperature of the cooling water for the engine is a second temperature or higher, the second temperature being lower than the first temperature. Thereby, in the case where the external electricity feed apparatus is performing the external electricity feed, it is possible to execute the canister purge earlier after the start of the engine than in the case where the external electricity feed apparatus is not performing the external electricity feed.

Further, in the hybrid vehicle according to the above aspect of the invention, in the case where the external electricity feed apparatus is not performing the external electricity feed, the execution condition may be a condition that the maximum purge rate is a first purge rate, and in the case where the external electricity feed apparatus is performing the external electricity feed, the execution condition may be a condition that the maximum purge rate is a second purge rate, the second purge rate being higher than the first purge rate. Thereby, it is possible to quickly complete the canister purge during the external electricity feed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Next, a mode for carrying out the invention will be described using an embodiment.

Figure 1:
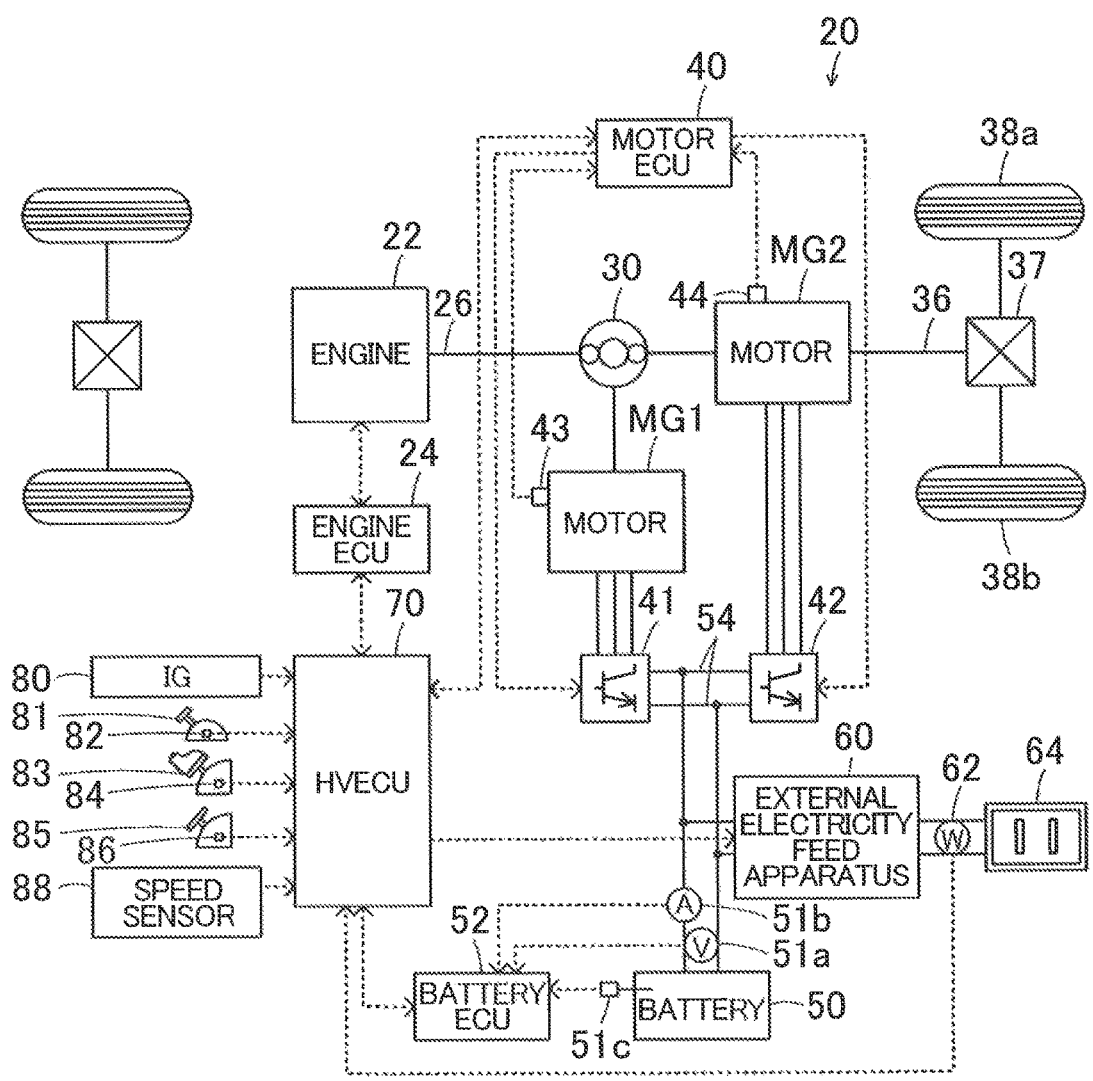
FIG. 1 is a configuration diagram showing an outline of a configuration of a hybrid vehicle 20 according to an embodiment of the invention.

FIG. 1 is a configuration diagram showing an outline of a configuration of a hybrid vehicle 20 according to an embodiment of the invention. As shown in the figure, the hybrid vehicle 20 according to the embodiment includes an engine 22, a planetary gear 30, motors MG1, MG2, inverters 41, 42, a battery 50, an external electricity feed apparatus 60, and a hybrid electronic control unit (hereinafter, referred to as a "HVECU") 70.

Figure 2:
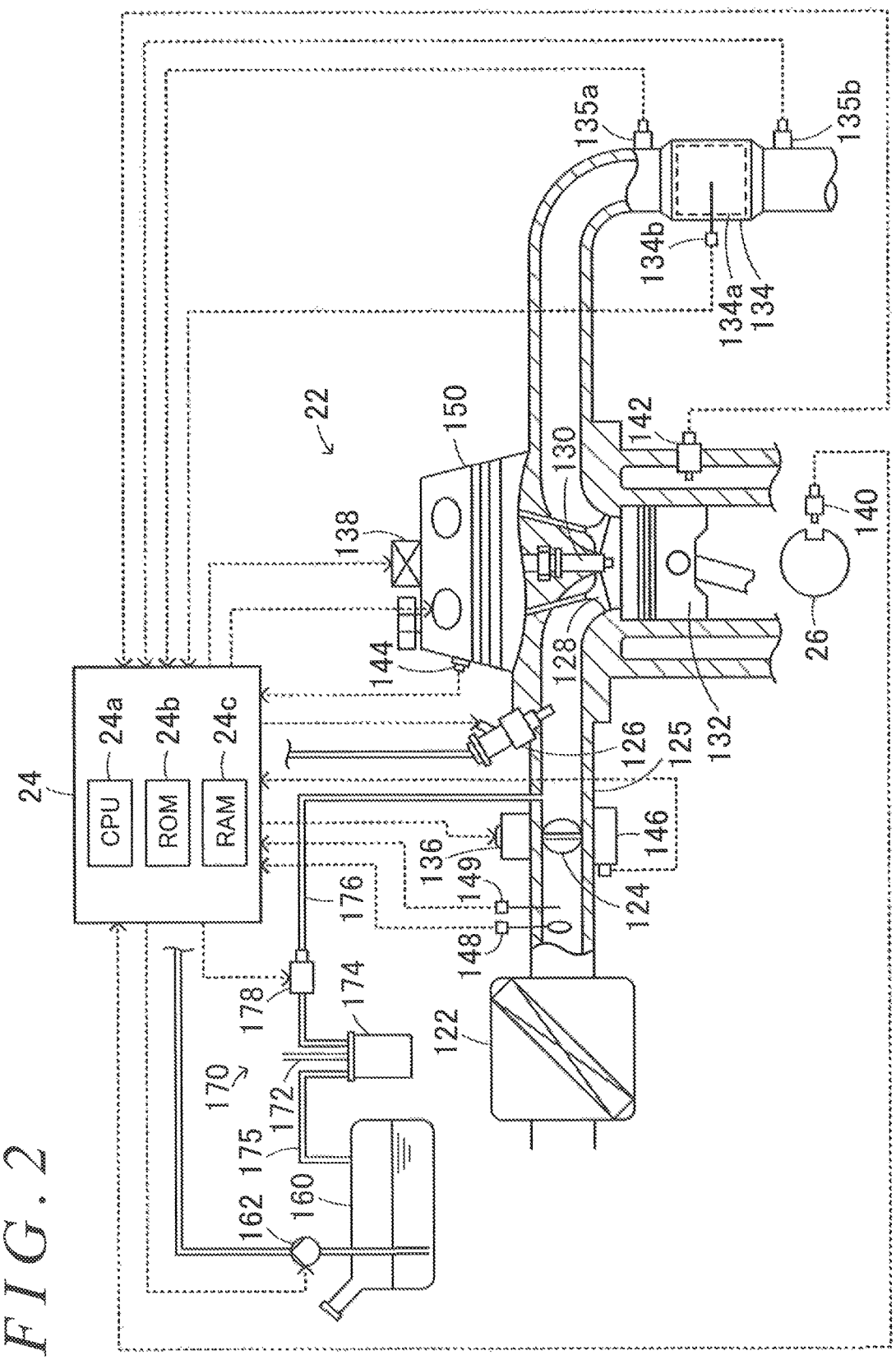
FIG. 2 is a configuration diagram showing an outline of a configuration of an engine 22.

The engine 22 is configured as an internal combustion engine that outputs dynamic power using gasoline or light oil as fuel. The operation control of the engine 22 is performed by an engine electronic control unit (hereinafter, referred to as an "engine ECU") 24. As shown in FIG. 2, in the engine 22, the air cleaned by an air cleaner 122 is taken in an intake pipe 125 through a throttle valve 124, gasoline is injected from a fuel injection valve 126, and the taken air and the gasoline are mixed. Then, the air-fuel mixture is taken in a combustion chamber through an intake valve 128, and is explosively combusted by an electric spark of a spark plug 130, and a reciprocating motion of a piston 132 pushed down by the energy is converted into a rotational motion of a crankshaft 26. The exhaust gas from the engine 22 is ejected to the exterior, through a purifying apparatus 134 including a purification catalyst (three-way catalyst) 134a that purifies harmful components such as carbon monoxide (CO), hydrocarbons (HC) and nitrogen oxides (NOx). Further, to the intake pipe 125 of the engine 22, the evaporated fuel generated in a fuel tank 160 is fed (purged) through an evaporated fuel purge system 170. The evaporated fuel purge system 170 includes a canister 174 that is filled with an adsorbent to adsorb the evaporated fuel from the fuel tank 160, for example, activated carbon and that is provided with an atmospheric air inlet 172, a communicating passage 175 that communicates between the fuel tank 160 and the canister 174, a purge passage 176 that communicates between the canister 174 and the intake pipe 125, and a purge control valve 178 that is disposed in the purge passage 176, The evaporated fuel purge system 170 regulates flow rate by regulating the opening degree of the purge control valve 178, and purges the evaporated fuel from the canister 174 to the intake pipe 125, using the intake manifold depression in the intake pipe 125. The engine 22 can suck the air-fuel mixture of air and the fuel containing the evaporated fuel, into the combustion chamber.

The engine 22 is controlled by the engine electronic control unit (hereinafter, referred to as the "engine ECU") 24. The engine ECU 24 is configured as a microprocessor centering on a CPU 24a, and in addition to the CPU 24a, includes a ROM 24b in which a processing program is stored, a RAM 24c in which data is temporarily stored, and non-illustrated input and output ports and a non-illustrated communication port. The engine ECU 24 receives signals from various sensors that detect the state of the engine 22, through the input ports. The signals to be input through the input ports are exemplified as follows: a crank position from a crank position sensor 140 that detects the rotational position of the crankshaft 26, a cooling water temperature Tw from a water temperature sensor 142 that detects the temperature of the cooling water for the engine 22, a cylinder pressure from a non-illustrated pressure sensor that is attached in the combustion chamber, a cam position from a cam position sensor 144 that detects the rotational position of a camshaft to open and close the intake valve 128 and an exhaust valve that perform intake and exhaust for the combustion chamber, a throttle position from a throttle valve position sensor 146 that detects the position of the throttle valve 124, an intake air quantity Qa from an air flow meter 148 that is attached to the intake pipe 125, an intake air temperature from a temperature sensor 149 that is attached to the intake pipe 125 similarly, a catalyst temperature Tc from a temperature sensor 134b that detects the temperature of the purification catalyst 134a, an air-fuel ratio AF from an air-fuel ratio sensor 135a, and an oxygen signal from an oxygen sensor 135b. Further, the engine ECU 24 outputs various control signals for driving the engine 22, through the output ports. The control signals to be output through the output ports are exemplified as follows: a drive signal to the fuel injection valve 126, a drive signal to a throttle motor 136 that regulates the position of the throttle valve 124, a control signal to an ignition coil 138 that is integrated with an igniter, a control signal to a variable valve timing mechanism 150 that can vary the opening-closing timing of the intake valve 128, a drive signal to a fuel pump 162, and a control signal to the purge control valve 178. The engine ECU 24, which communicates with the hybrid electronic control unit 70, performs the operation control of the engine 22 by a control signal from the hybrid electronic control unit 70, and outputs the data relevant to the operating state of the engine 22, as necessary. Here, the engine ECU 24 computes the speed of the crankshaft 26, that is, speed Ne of the engine 22, based on the crank position from the crank position sensor 140.

The planetary gear 30 is configured as a single pinion type planetary gear mechanism. A sun gear of the planetary gear 30 is connected with a rotor of the motor MG1. A ring gear of the planetary gear 30 is connected with a drive shaft 36 linked with drive wheels 38a, 38b through a differential gear 37, and a rotor of the motor MG2. A carrier of the planetary gear 30 is connected with the crankshaft 26 of the engine 22.

The motor MG1, for example, is configured as a synchronous generator-motor. As described above, the rotor of the motor MG1 is connected with the sun gear of the planetary gear 30. The motor MG2, for example, is configured as a synchronous generator-motor. As described above, the rotor of the motor MG2 is connected with the drive shaft 36. The inverters 41, 42, together with the battery 50, are connected with an electric power line 54. The rotational drives of the motors MG1, MG2 are performed by a motor electronic control unit (hereinafter, a "motor ECU") 40, through the switching control of non-illustrated multiple switching elements of the inverters 41, 42.

The motor ECU 40 is configured as a microprocessor centering on a CPU, which is not illustrated, and in addition to the CPU, includes a ROM in which a processing program is stored, a RAM in which data is temporarily stored, input and output ports, and a communication port. The motor ECU 40 receives signals from various sensors necessary for the drive control of the motors MG1, MG2, through the input ports. The signals from the various sensors are exemplified as follows: rotational positions θm1, θm2 from rotational position detection sensors 43, 44 that detect the rotational positions of the rotors of the motors MG1, MG2, and phase currents from current sensors that detect the electric current to flow in the phases of the motors MG1, MG2. The motor ECU 40 outputs switching control signals to the non-illustrated switching elements of the inverters 41, 42, and the like, through the output ports. The motor ECU 40 is connected with the HVECU 70 through the communication port. The motor ECU 40 performs the drive control of the motors MG1, MG2, by a control signal from the HVECU 70. Further, the motor ECU 40, as necessary, outputs the data relevant to the drive states of the motors MG1, MG2, to the HVECU 70. The motor ECU 40 computes rotation speeds Nm1, Nm2 of the motors MG1, MG2, based on the rotational positions θm1, θm2 of the rotors of the motors MG1, MG2 that are obtained from the rotational position detection sensors 43, 44.

The battery 50, for example, is configured as a lithium ion secondary battery, and as described above, is connected with the electric power line 54, together with the inverters 41, 42. The battery 50 is managed by a battery electronic control unit (hereinafter, referred to as a "battery ECU") 52.

The battery ECU 52 is configured as a microprocessor centering on a CPU, which is not illustrated, and in addition to the CPU, includes a ROM in which a processing program is stored, a RAM in which data is temporarily stored, input and output ports, and a communication port. The battery ECU 52 receives signals from various sensors necessary to manage the battery 50, through the input ports. The signals from the various sensors are exemplified as follows: a battery voltage Vb from a voltage sensor 51a that is disposed between terminals of the battery 50, a battery current Ib from a current sensor 51b that is attached to an output terminal of the battery 50 (when the battery 50 performs the discharge, the value is positive), and a battery temperature Tb from a temperature sensor 51c that is attached to the battery 50. The battery ECU 52 is connected with the HVECU 70 through the communication port. The battery ECU 52, as necessary, outputs the data relevant to the state of the battery 50, to the HVECU 70. The battery ECU 52 computes state-of-charge SOC, based on the integrated value of the battery current Ib from the current sensor 51b. The state-of-charge SOC is the ratio of a dischargeable electric power capacity of the battery 50 to the total capacity of the battery 50. Further, the battery ECU 52 computes input and output limits Win, Wout, based on the computed state-of-charge SOC and the battery temperature Tb from the temperature sensor 51c. The input and output limits Win, Wout are the maximum permissible electric powers to which the battery 50 may be charged and discharged.

The external electricity feed apparatus 60 is connected with the electric power line 54 and an electric outlet 64 for the connection with an external device that is not a constituent element of the vehicle. The external electricity feed apparatus 60 includes an inverter, which is not illustrated. The inverter converts a direct-current electric power on the electric power line 54 into an alternating-current electric power with a desired voltage (for example, an electric power with AC 100 V), and feeds the alternating-current electric power to the external device connected with the electric outlet 64. Hereinafter, the feed of the electric power on the electric power line 54 to the external device is referred to as the "external electricity feed". In the inverter, the switching control of non-illustrated multiple switching elements is performed by the HVECU 70.

The HVECU 70 is configured as a microprocessor centering on a CPU, which is not illustrated, and in addition to the CPU, includes a ROM in which a processing program is stored, a RAM in which data is temporarily stored, input and output ports, and communication ports. The HVECU 70 receives signals from various sensors through the input ports. The signals from the various sensors are exemplified as follows: a fed electric power Ph from an electric power sensor 62 that detects fed electric power for the external electricity feed by the external electricity feed apparatus 60, an ignition signal from an ignition switch 80, a shift position SP from a shift position sensor 82 that detects the operation position of a shift lever 81, an accelerator position Acc from an accelerator pedal position sensor 84 that detects the stepping quantity for an accelerator pedal 83, a brake pedal position BP from a brake pedal position sensor 86 that detects the stepping quantity for a brake pedal 85, and a vehicle speed V from a speed sensor 88. The HVECU 70 outputs a switching control signal to a switching element of the inverter of the external electricity feed apparatus 60, and the like, through the output ports. As described above, the HVECU 70 is connected with the engine ECU 24, the motor ECU 40 and the battery ECU 52, through the communication ports. The HVECU 70 exchanges various control signals and data, with the engine ECU 24, the motor ECU 40 and the battery ECU 52.

Here, in the hybrid vehicle 20 according to the embodiment, as the shift position SP to be detected by the shift position sensor 82, there are a parking position (P position) to be used at the time of parking, a reverse position (R position) for backward running, a neutral position (N position) that is in neutral, a drive position (D position) for forward running, and the like. Then, when the shift position SP is the P position, the drive wheels 38a, 38b are locked by a parking lock mechanism, which is not illustrated.

The hybrid vehicle 20 according to the embodiment configured in this way sets a demand drive power for the drive shaft 36 based on the accelerator position Acc and the vehicle speed V, and performs the operation control of the engine 22 and motors MG1, MG2 such that a demand dynamic power comparable to the demand drive power is output to the drive shaft 36. As operation modes for the engine 22 and the motors MG1, MG2, there are the following modes (1) to (3): (1) a torque conversion operation mode: a mode of performing the operation control of the engine 22 such that a dynamic power corresponding to the demand dynamic power is output from the engine 22, and performing the drive control of the motors MG1, MG2 such that the torque conversion of all the dynamic power to be output from the engine 22 is performed by the planetary gear 30 and the motors MG1, MG2 and the demand dynamic power is output to the drive shaft 36, (2) a charge/discharge operation mode: a mode of performing the operation control of the engine 22 such that a dynamic power comparable to the sum of the demand dynamic power and an electric power necessary to charge or discharge the battery 50 is output from the engine 22, and performing the drive control of the motors MG1, MG2 such that the torque conversion of all or some of the dynamic power to be output from the engine 22 is performed by the planetary gear 30 and the motors MG1, MG2 with the charge/discharge of the battery 50 and the demand dynamic power is output to the drive shaft 36, and (3) a motor operation mode: a mode of stopping the operation of the engine 22 and performing the drive control of the motor MG2 such that the demand dynamic power is output to the drive shaft 36.

Further, when the shift position SP is the P position, the hybrid vehicle 20 according to the embodiment, basically, stops the operation of the engine 22. Then, when the state-of-charge SOC of the battery 50 becomes equal to or less than a previously decided threshold Sst due to the electric power consumption by non-illustrated auxiliary machines (an air-conditioning apparatus and the like), the external electricity feed by the external electricity feed apparatus 60, and the like, the motor MG1, by cranking, starts the engine 22. Then, the engine 22 and the motor MG1 are controlled such that the battery 50 is charged by the electricity generation with the motor MG1 using the dynamic power from the engine 22. Hereinafter, the control is referred to as a "predetermined charge control". Then, when the state-of-charge SOC of the battery 50 becomes equal to or greater than a threshold Ssp, which is greater than the threshold Sst, the predetermined charge control is finished, and the operation of the engine 22 is stopped.

Figure 3:
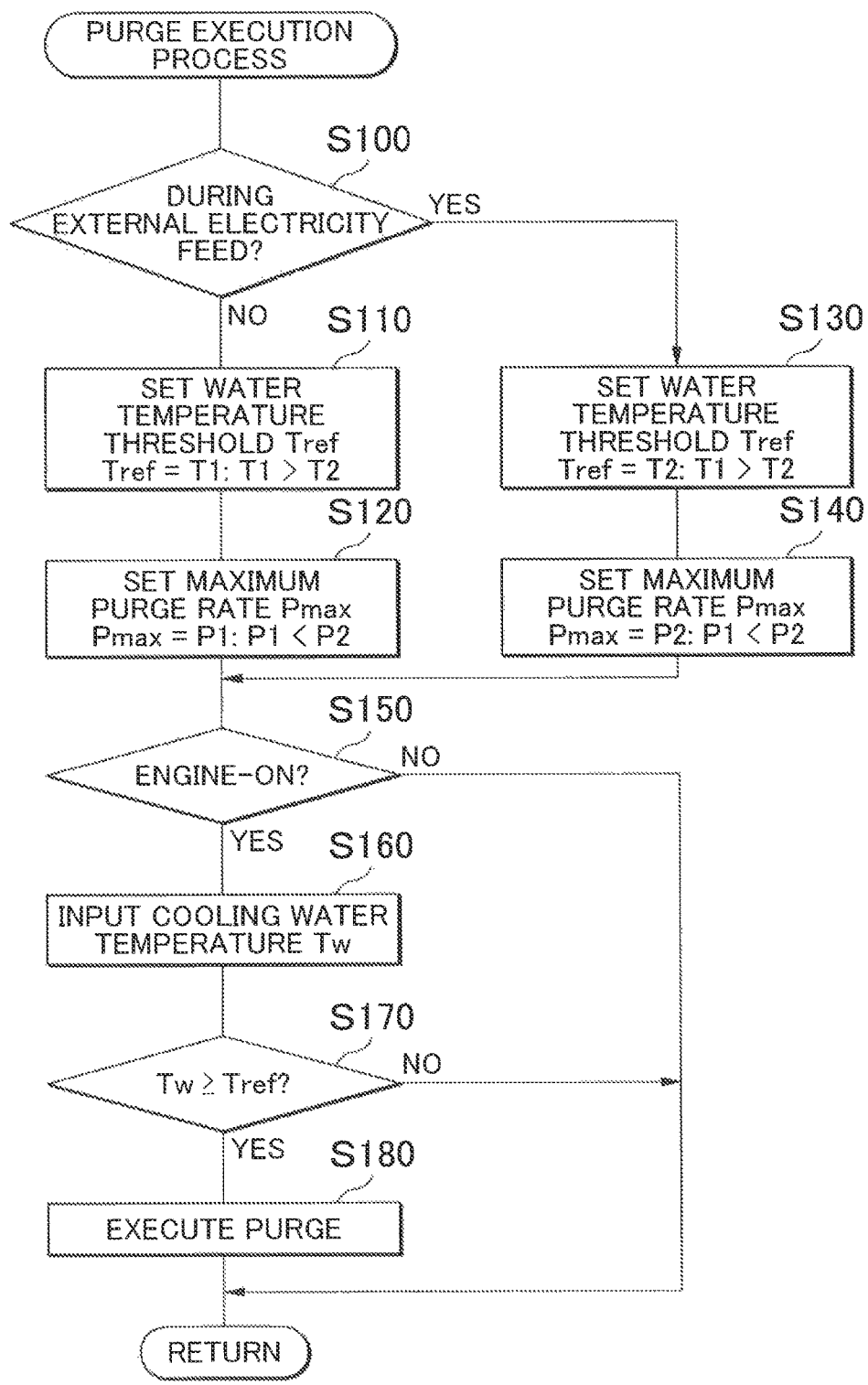
FIG. 3 is a flowchart showing an exemplary purge execution process that is executed by an engine ECU 24.

Next, the behavior of the hybrid vehicle 20 according to the embodiment configured in this way, particularly, the behavior in canister purge will be described. FIG. 3 is a flowchart showing an exemplary purge execution process to be executed by the engine ECU 24 when it is determined that the execution of the canister purge is necessary because evaporated fuel is adsorbed to some extent in the canister 174. The process is executed repeatedly at a predetermined time interval (for example, every few seconds), until the canister purge is executed.

When the purge execution process is executed, the engine ECU 24, first, determines whether the external electricity feed apparatus 60 is performing the external electricity feed (step S100). The determination is can be performed, by receiving, through the communication, a control signal (for example, a flag) of whether the HVECU 70 is performing the control of the external electricity feed by the external electricity feed apparatus 60, and checking the received control signal.

In the case where the external electricity feed apparatus 60 is not performing the external electricity feed, a previously decided temperature T1 (for example, 35° C., 40° C. or the like) is set as a water temperature threshold Tref to be used for the determination of whether to permit the canister purge (step S110), and a previously decided value P1 (for example, 8%, 10% or the like) is set as a maximum purge rate Pmax (step S120). Here, the purge rate is the rate of evaporated fuel gas quantity to the intake air quantity (evaporated fuel gas quantity/intake air quantity). The maximum purge rate Pmax is the maximum of the purge rate that is permitted in the canister purge. Then, whether the engine 22 is in operation is determined (step S150), and when the engine 22 is not in operation, the process is finished without the execution of the canister purge. When the engine 22 is in operation, the cooling water temperature Tw is input from the water temperature sensor 142 (step S160), and whether the cooling water temperature Tw is the water temperature threshold Tref or higher is determined (step S170). When the cooling water temperature Tw is lower than the water temperature threshold Tref, the process is finished without the execution of the canister purge. When the cooling water temperature Tw is the water temperature threshold Tref or higher, the canister purge is executed (step S180), and then the process is finished. In the canister purge, the opening degree of the purge control valve 178 of the evaporated fuel purge system 170 is regulated within the range of the maximum purge rate Pmax, and the evaporated fuel from the canister 174 is purged to the intake pipe 125.

On the other hand, when it is determined that the external electricity feed apparatus 60 is performing the external electricity feed in step S100, the water temperature threshold Tref is set to a temperature T2 (for example, 20° C., 25° C. or the like), which is lower than the temperature T1 when the external electricity feed apparatus 60 is not performing the external electricity feed (step S130), and the maximum purge rate Pmax is set to a value P2 (for example, 18%, 20% or the like), which is greater than the value P1 when the external electricity feed apparatus 60 is not performing the external electricity feed (step S140). Then, the processes of steps S150 to S180 are executed using the water temperature threshold Tref of the temperature T2 and the maximum purge rate Pmax of the value P2. That is, when the engine 22 is not in operation, or when the cooling water temperature Tw is lower than the water temperature threshold Tref, the canister purge is not executed, and when the engine 22 is in operation and the cooling water temperature Tw is the water temperature threshold Tref or higher, the canister purge is executed. Thus, compared to the case where the external electricity feed apparatus 60 is not performing the external electricity feed, in the case where the external electricity feed apparatus 60 is performing the external electricity feed, the canister purge is executed when the cooling water temperature Tw is equal to or higher than the temperature T2, which is lower than the temperature T1. Therefore, it is possible to execute the canister purge, even when the cooling water temperature Tw is lower than the temperature T1. Thereby, it is possible to increase the opportunity to execute the canister purge. Further, in this case, the canister purge is performed within the range of the maximum purge rate Pmax set to the value P2, which is greater than the value P1, and therefore, it is possible to quickly complete the canister purge. Here, the reason why the canister purge can be performed during the external electricity feed using the condition that the cooling water temperature Tw is the lower temperature T2 or higher and the maximum purge rate Pmax is the greater value P2 is that the vehicle is at a stop during the external electricity feed. That is, this is because it seems that the influence on drivability, while the vehicle is at a stop, is small even when the speed of the engine 22 fluctuates by the canister purge.

In the hybrid vehicle 20 according to the embodiment described above, in the case where the external electricity feed apparatus 60 is not performing the external electricity feed, the canister purge is executed when the engine 22 is in operation and the cooling water temperature Tw is equal to or higher than the temperature T1 set as the water temperature threshold Tref. On the other hand, in the case where the external electricity feed apparatus 60 is performing the external electricity feed, the canister purge is executed when the engine 22 is in operation and the cooling water temperature Tw is equal to or higher than the temperature T2 (T2<T1) set as the water temperature threshold Tref. That is, compared to the case where the external electricity feed apparatus 60 is not performing the external electricity feed, in the case where the external electricity feed apparatus 60 is performing the external electricity feed, the canister purge is executed when the cooling water temperature Tw is equal to or higher than the temperature T2, which is lower than the temperature T1. Thereby, it is possible to increase the opportunity to perform the canister purge, and to enhance evaporative emission performance. Further, it is possible to suppress the increase in the operating time of the engine 22 due to the canister purge after the external electricity feed is finished.

Further, in the hybrid vehicle 20 according to the embodiment, in the case where the external electricity feed apparatus 60 is not performing the external electricity feed, the canister purge is executed within the range of the maximum purge rate Pmax set to the value P1. On the other hand, in the case where the external electricity feed apparatus 60 is performing the external electricity feed, the canister purge is executed within the range of the maximum purge rate Pmax set to the value P2, which is greater than the value P1. Therefore, in the case where the external electricity feed apparatus 60 is performing the external electricity feed, it is possible to complete the canister purge more quickly than in the case where the external electricity feed apparatus 60 is not performing the external electricity feed.

In the hybrid vehicle 20 according to the embodiment, in the case where the external electricity feed apparatus 60 is performing the external electricity feed, the canister purge is executed using the maximum purge rate Pmax of the value P2, which is greater than in the case where the external electricity feed apparatus 60 is not performing the external electricity feed. However, even in the case where the external electricity feed apparatus 60 is performing the external electricity feed, the canister purge may be executed using the maximum purge rate Pmax of the value P1, which is used in the case where the external electricity feed apparatus 60 is not performing the external electricity feed.

Figure 4:
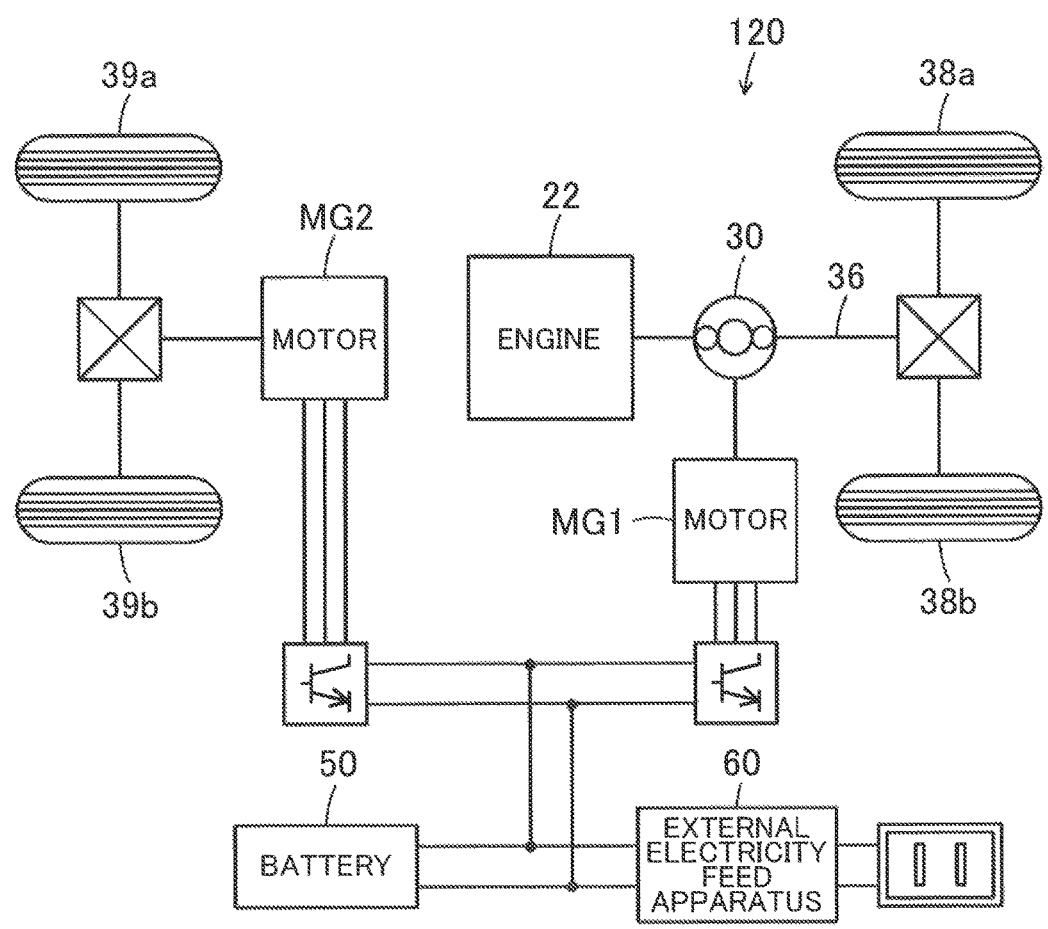
FIG. 4 is a configuration diagram showing an outline of a configuration of a hybrid vehicle 120 according to a modification.

In the hybrid vehicle 20 according to the embodiment, the dynamic power from the motor MG2 is output to the drive shaft 36 linked with the drive wheels 38a, 38b. However, as exemplified in a hybrid vehicle 120 according to a modification in FIG. 4, the dynamic power from the motor MG2 may be output to an axle (an axle connected with wheels 39a, 39b in FIG. 4) that is different from an axle connected with the drive wheels 38a, 38b.

Figure 5:
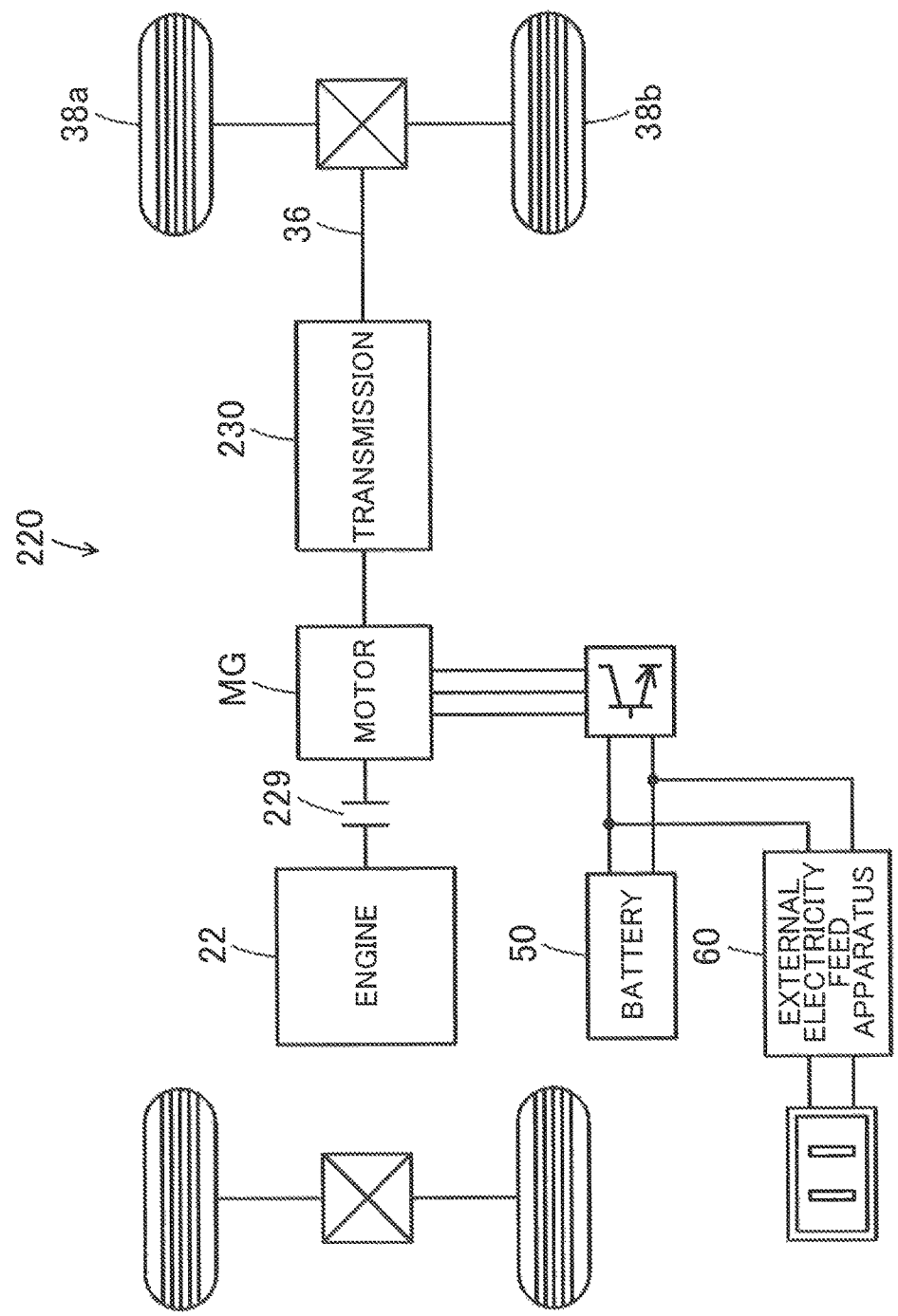
FIG. 5 is a configuration diagram showing an outline of a configuration of a hybrid vehicle 220 according to a modification.

The hybrid vehicle 20 according to the embodiment adopts a configuration in which the engine 22 and the motor MG1 are connected through the planetary gear 30 with the drive shaft 36 linked with the drive wheels 38a, 38b and the motor MG2 is connected with the drive shaft 36. However, as exemplified in a hybrid vehicle 220 according to a modification in FIG. 5, it is allowable to adopt a configuration in which a motor MG is connected through a transmission 230 with the drive shaft 36 linked with the drive wheels 38a, 38b and the engine 22 is connected through a clutch 229 with a rotational shaft of the motor MG. For starting the engine 22 while the external electricity feed apparatus 60 is performing the external electricity feed and charging the battery 50 by the electricity generation with the motor MG, the hybrid vehicle 220 only needs to engage the clutch 229 and to shift the transmission 230 into neutral. Further, the invention may be applied to a so-called series hybrid vehicle.

The correspondence relation between main elements of the embodiment and main elements of the invention described in the section "SUMMARY OF THE INVENTION" will be described. In the embodiment, the engine 22 corresponds to the "engine", the canister 174 corresponds to the "canister", the purge control valve 178 corresponds to the "purge valve", the engine ECU 24 corresponds to the "electronic control unit", the motor MG1 corresponds to the "electric generator", the battery 50 corresponds to the "battery", and the external electricity feed apparatus 60 corresponds to the "external electricity feed apparatus".

Here, the embodiment is an example for specifically describing a mode for carrying out the invention described in the section "SUMMARY OF THE INVENTION", and therefore, the correspondence relation between the main elements of the embodiment and the main elements of the invention described in the section "SUMMARY OF THE INVENTION" does not limit the elements of the invention described in the section "SUMMARY OF THE INVENTION". That is, the invention described in the section "SUMMARY OF THE INVENTION" should be interpreted based on the description in the section, and the embodiment is just a specific example of the invention described in the section "SUMMARY OF THE INVENTION".

Thus, the mode for carrying out the invention has been described using the embodiment. However, the invention is not limited to the embodiment at all, and it is natural that the invention can be carried out as various modes in the range without departing from the spirit of the invention.

The invention can be utilized in manufacturing industries for hybrid vehicles, and the like.

What is claimed is:

1. A hybrid vehicle comprising:
   an engine that receives feed of fuel stored in a fuel tank and that outputs dynamic power;
   a canister that adsorbs evaporated fuel generated in the fuel tank;
   a purge valve attached to a feed pipe, the feed pipe being a pipe through which evaporated fuel gas is fed to an intake pipe of the engine, the evaporated fuel gas containing the evaporated fuel adsorbed by the canister;
   an electronic control unit configured to perform an opening-closing control of the purge valve such that the evaporated fuel gas is fed to the intake pipe;
   an electric generator that generates electricity using the dynamic power from the engine;
   a battery connected with the electric generator through an electric power line; and
   an external electricity feed apparatus that performs an external electricity feed by which electric power on the electric power line is fed to an external device, wherein the external electricity feed apparatus comprises an inverter, and the electronic control unit is configured to control the inverter to supply alternating-current electric power to the external device during the external electricity feed, wherein
   the electronic control unit is further configured to
      determine whether the external electricity feed apparatus is performing the external electricity feed,
      perform the opening-closing control of the purge valve using a first execution condition in a case where the external electricity feed apparatus is performing the external electricity feed, and
      perform the opening-closing control of the purge valve using a second execution condition in a case where the external electricity feed apparatus is not performing the external electricity feed.

2. The hybrid vehicle according to claim 1 wherein in the case where the external electricity feed apparatus is not performing the external electricity feed, the second execution condition is a condition that a temperature of cooling water for the engine reaches at least a first temperature, and in the case where the external electricity feed apparatus is performing the external electricity feed, the first execution condition is a condition that the temperature of the cooling water for the engine reaches at least a second temperature, the second temperature being lower than the first temperature.

3. The hybrid vehicle according to claim 1 wherein in the case where the external electricity feed apparatus is not performing the external electricity feed, the second execution condition is a condition that a maximum purge rate is a first purge rate, and in the case where the external electricity feed apparatus is performing the external electricity feed, the first execution condition is a condition that the maximum purge rate is a second purge rate, the second purge rate being higher than the first purge rate.

* * * * *